Nov. 20, 1934.  H. V. RAU  1,981,070

TUFTING ANCHOR

Filed March 9, 1933

INVENTOR-
Henry V. Rau
BY Ramsey & Kent
his ATTORNEYS

Patented Nov. 20, 1934

1,981,070

UNITED STATES PATENT OFFICE 1,981,070

TUFTING ANCHOR

Henry V. Rau, Amityville, N. Y., assignor to Edwin B. Stimpson Company, Brooklyn, N. Y., a corporation of New York Application March 9, 1933, Serial No. 660,142

3 Claims. (Cl. 5—356)

The present invention relates broadly to fastening devices and more especially to a tufting anchor for use in tufting upholstering.

The present invention comprises an anchoring member formed by cutting away a portion of the side of a solid tubular rivet, thereby exposing the opening of the rivet through the cutaway recess. In accordance with the present invention the tubular rivet comprises a solid head and a solid metal stem which has been drilled a short distance from the end of the rivet. The cutaway recess exposes a portion of the side of the opening drilled in the rivet to provide a channel for the tension member to which the anchor is secured. A cylindrical part of the stem of the rivet is retained adjacent the head of the rivet so that a cylindrical portion is presented to the upholstering material whereby in the use of the tufted upholstery, there is no tendency of the anchoring member to cut the material surrounding the stem of the rivet. After the recess is cut in the sides of the rivet, the rivets are tumbled in a tumbling barrel until all rough edges are worn away so there is no tendency whatever of the rough edges to cut the tension cord. In the use of the present device, a string or cord of the proper length is doubled upon itself and knotted. The knotted cord is passed through the opening in the anchoring member and the knot is brought solidly against the shoulder of the recess adjacent the opening. The cord is then sewed through the upholstering to be tufted which is compressed sufficiently to permit the free end of the cord to be passed through the hole in the companion anchoring member and looped around the stem of this member. Then, the compression is released and the expansion of the compressed material draws the anchoring members into place and places the cord under tension, thus completing the tufting operation.

It is recognized that the present invention may be embodied in constructions differing somewhat from the present disclosure without departing from the spirit of the invention.

Figure 1:
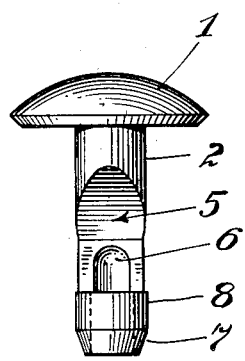
Fig. 1 is a front elevational view of the preferred form of the present invention.
Figure 2:
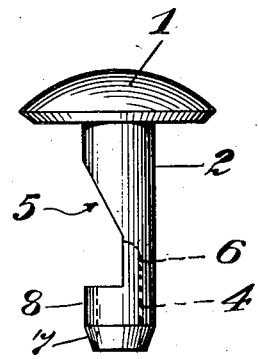
Fig. 2 is a side view of the device shown in Fig. 1.
Figure 3:
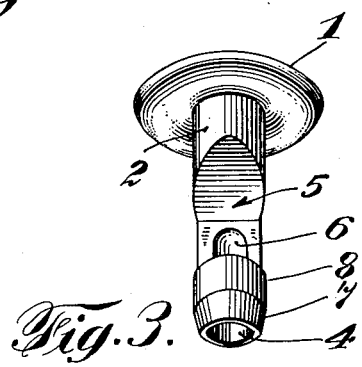
Fig. 3 is a perspective view looking beneath the head of the anchoring member.

The present invention comprises a solid rivet of iron, brass, or other suitable material comprising a head 1 and an integral cylindrical stem having a cylindrical portion 2 adjacent the head. The stem is drilled or perforated to provide an opening 4 extending into the stem. The side wall of the stem is cut away to provide a recess 5. The cutting away of the recess preferably is less than the complete depth of the diameter of the opening 4 so that a groove 6 is presented as a continuation of the opening 4 in the back wall of the recess 5 to provide a channel for the cord. The tip of the anchoring member preferably is bevelled at 7 and comprises a cylindrical collar 8 surrounding the opening 4.

Figure 4:
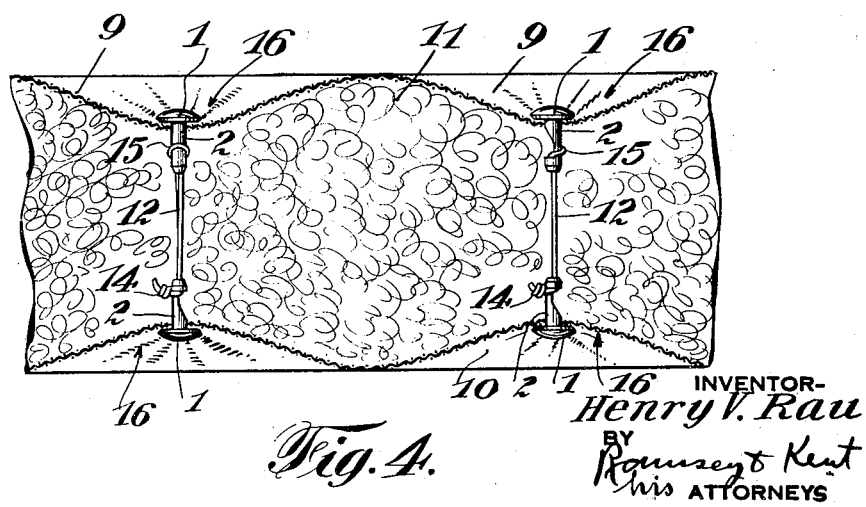
Fig. 4 is a sectional view through a portion of a tufted upholstering.

Referring to Fig. 4 showing upholstering materials 9 and 10, on each side of an elastic filler 11, such as kapok fiber or other elastic materials commonly used in seats or other upholstering. A stout cord 12 is provided with a knot 14 and the cord is threaded through the opening 4 in the anchoring member. The cord is then sewed through the filler material 11 and the upholstering materials 9 and 10 are subjected to pressure to compress the resilient filler 11 sufficiently to permit the cord 12 to extend through the upholstering material 9 and to be passed through the opening 4 in the upper anchoring member. Then, the loop 15 of the cord is passed over the head 1 of the anchoring member and looped around the cylindrical stem thereof. The pressure is released and the expansion of the filler 11 sets the anchoring members in place and places the cord 12 under tension, thereby forming tufts 16 in the upholstering.

The present invention provides a sturdy anchoring member wherein the cord is securely held without danger of the anchoring member cutting the cord which is located a sufficient distance beneath the upholstering material to obviate any wear which might be occasioned by rubbing of the material on the cord when the upholstering is in use.

What I claim is:

1. A metal tufting member comprising a solid metal stem, a solid metal enlarged head on one end of said stem, said stem being cylindrical adjacent said head and adjacent the end of the stem remote from said head, said stem being provided with a recess in one side thereof, and the end of said stem remote from the head having an opening extending longitudinally of said stem and leading to said recess.

2. A tufting anchor comprising a cylindrical stem with a recess in one side thereof, a head on one end of said stem, a full cylindrical portion of said stem between said head and said recess, the end of the recess adjacent the head having an inclined wall with the inclination being toward said head, the other end of said stem being provided with an opening leading to said recess.

3. A tufting anchor comprising a cylindrical stem provided with a recess in one side thereof, a head integral with one end of said stem, the other end of said stem being provided with a cylindrical opening leading from the outer end thereof to said recess, said opening comprising a passageway for a tie loop, the wall of said recess adjacent said head being inclined outwardly to guide outwardly the end of the tie loop inserted through the said opening to facilitate passing said loop over the head and around said stem remote from the head.

HENRY V. RAU.